(12) United States Patent
Chuang et al.

(10) Patent No.: US 12,259,556 B2
(45) Date of Patent: Mar. 25, 2025

(54) HEAD-MOUNTED DISPLAY (71) Applicant: Coretronic Corporation, Hsin-Chu (TW)

(72) Inventors: Fu-Ming Chuang, Hsin-Chu (TW); Hsin-Hsiang Lo, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 323 days.

(21) Appl. No.: 17/862,414

(22) Filed: Jul. 12, 2022

(65) Prior Publication Data

US 2023/0049696 A1 Feb. 16, 2023

(30) Foreign Application Priority Data

Aug. 3, 2021 (CN) .......................... 202110883882.0

(51) Int. Cl.
*G02B 27/01* (2006.01)
*F21V 8/00* (2006.01)
*G02B 13/16* (2006.01)
*G02B 13/18* (2006.01)

(52) U.S. Cl.
CPC ......... *G02B 27/0172* (2013.01); *G02B 6/005* (2013.01); *G02B 13/16* (2013.01); *G02B 13/18* (2013.01)

(58) Field of Classification Search
None
See application file for complete search history.

(56) References Cited

U.S. PATENT DOCUMENTS

| 9,195,066 | B2* | 11/2015 | Komatsu ............. G02B 27/017 |
| 9,733,475 | B1 | 8/2017 | Brown et al. |
| 11,073,701 | B2 | 7/2021 | Matsumura et al. |
| 2006/0119951 | A1* | 6/2006 | McGuire, Jr. ...... G02B 27/1026 |
| | | | 359/630 |

FOREIGN PATENT DOCUMENTS

| CN | 101446684 | 6/2009 |
| CN | 103984099 | 8/2014 |

(Continued)

OTHER PUBLICATIONS

Jian Han et al, "Portable waveguide display system with a large field of view by integrating freeform elements and volume holograms", Optics Express, Feb. 2015, pp. 3534-3549.

(Continued)

*Primary Examiner* — Jerry Rahll
(74) *Attorney, Agent, or Firm* — JCIPRNET (57) ABSTRACT A head-mounted display including an image generator, a projection lens, and a waveguide is provided. The image generator is configured to provide an image beam. The projection lens is disposed on a path of the image beam. The projection lens has an image side and an object side. The image generator is configured at the image side. The projection lens includes a first lens element and a lens element group. The lens element group is disposed between the image generator and the first lens element. A first central axis of the first lens element and a second central axis of the lens element group are not overlapped. The waveguide is disposed on the path of the image beam and located at the object side of the projection lens.

12 Claims, 4 Drawing Sheets

(56) References Cited

FOREIGN PATENT DOCUMENTS

| | | |
|---|---|---|
| CN | 101174028 | 5/2015 |
| CN | 110082914 | 8/2019 |
| TW | 201825932 | 7/2018 |

OTHER PUBLICATIONS

Qichao Hou et al, "Geometrical Waveguide in See-Through Head-Mounted Display: A Review", Proceedings of SPIE, vol. 10021, Oct. 2016, pp. 1-8.
"Search Report of Europe Counterpart Application", issued on Dec. 19, 2022, pp. 1-8.

* cited by examiner

HEAD-MOUNTED DISPLAY

CROSS-REFERENCE TO RELATED APPLICATION

This application claims the priority benefit of China application serial no. 202110883882.0, filed on Aug. 3, 2021. The entirety of the above-mentioned patent application is hereby incorporated by reference herein and made a part of this specification.

BACKGROUND

Technical Field

The invention relates to a display, in particular, to a head-mounted display.

Description of Related Art

A head-mounted display with a favorable display effect plays a key role in the augmented reality and the virtual reality technologies. A favorable display is required to, for example, generate an image with low distortion and high quality. Furthermore, since the display may be worn for a long time, it has to be light and slim. In addition, a projection lens in the display may include multiple lenses. Apart from favorable optical properties of the lenses, whether it is easy for the lenses to be processed is one of the key factors determining the cost thereof. In the display of the conventional technology, a projection lens with non-axisymmetric lens elements may be required to facilitate the image quality of the display. However, such projection lens greatly increases the manufacturing cost of the display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a head-mounted display which includes a projection lens including multiple lens elements and adopting axisymmetric lens elements. The head-mounted display is light and slim, and exhibits low distortion and high image quality.

According to an embodiment of the invention, a head-mounted display including an image generator, a projection lens, and a waveguide is provided. The image generator is configured to provide an image beam. The projection lens is disposed on a path of the image beam, and the projection lens has an image side and an object side. The image generator is configured at the image side. The projection lens includes a first lens element and a lens element group. The first lens element has a first central axis. The lens element group is disposed between the image generator and the first lens element. The lens element group has a second central axis. The first central axis of the first lens element and the second central axis of the lens element group are not overlapped. The waveguide is disposed on the path of the image beam and is located at the object side of the projection lens.

Based on the above, in the head-mounted display provided in the embodiments of the invention, with the property that the first central axis of the first lens element and the second central axis of the lens element group are not overlapped, the axisymmetric lenses are adopted instead of using non-axisymmetric lenses to greatly reduce the manufacturing cost. Moreover, the head-mounted display provided in the embodiments of the invention is light and slim, and exhibits low distortion and high image quality.

In order to make the aforementioned features and advantages of the invention comprehensible, embodiments accompanied with drawings are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
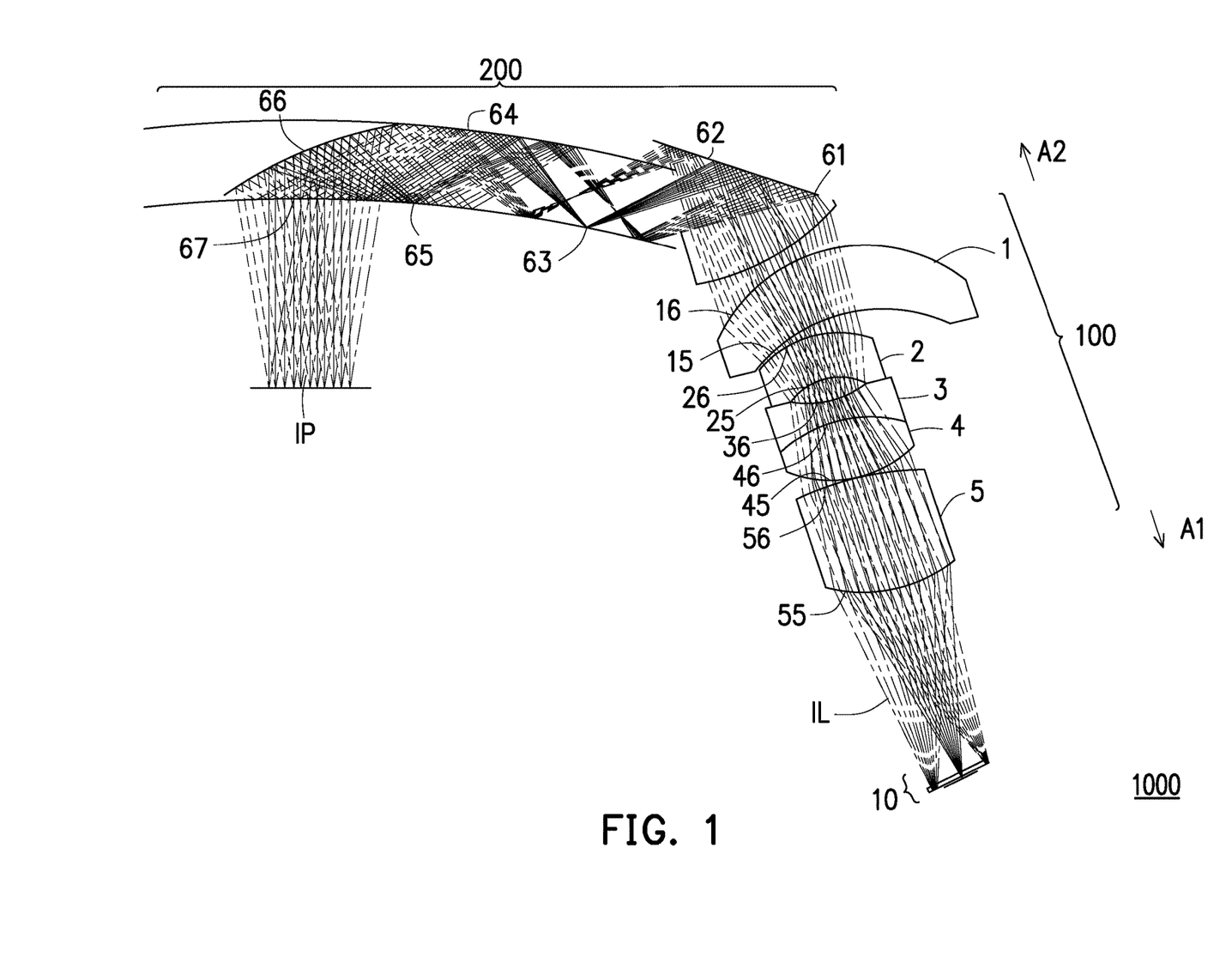
FIG. 1 is a schematic diagram of a head-mounted display according to an embodiment of the invention.
Figure 2:
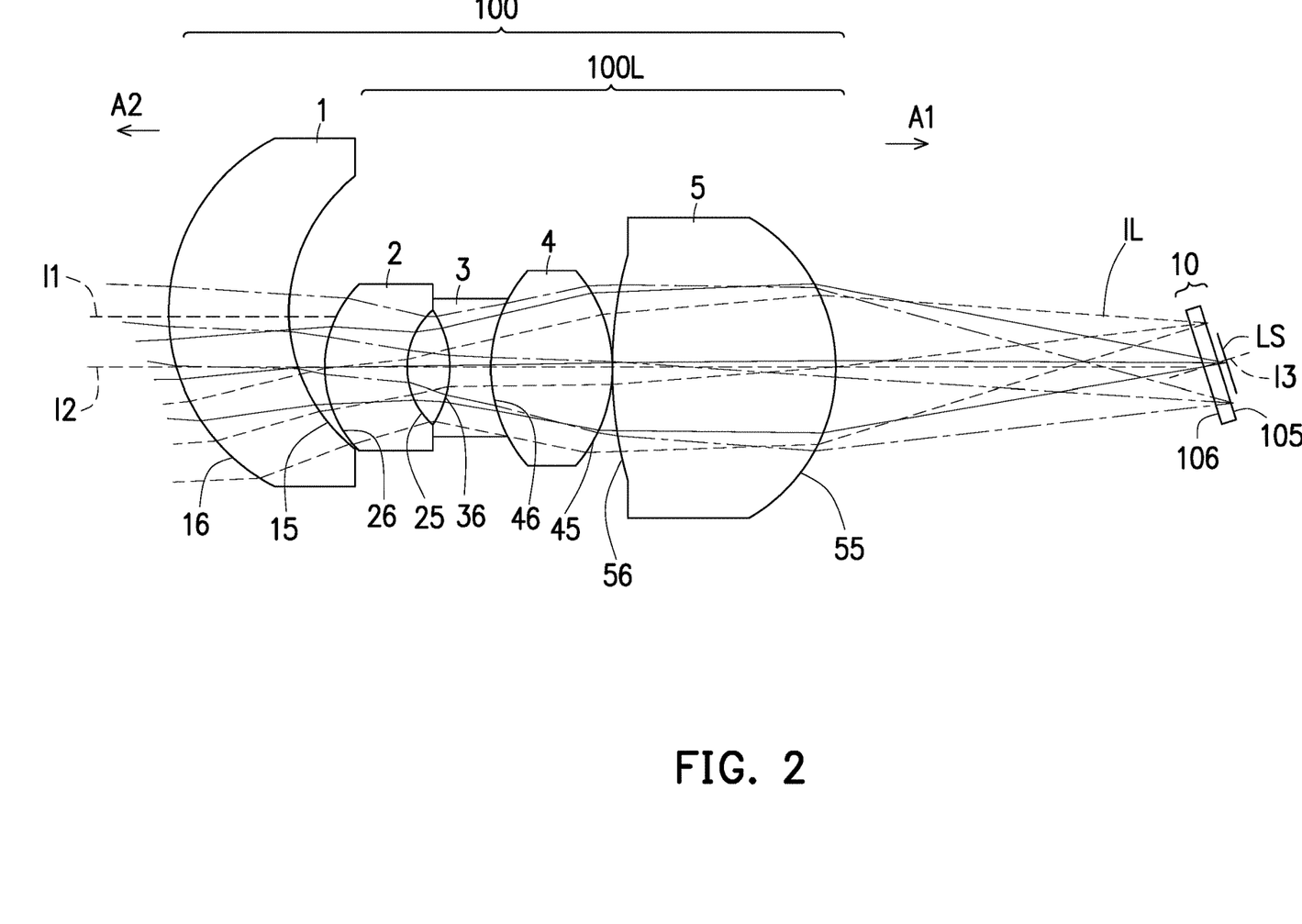
FIG. 2 is a schematic diagram of an image generator and a projection lens according to an embodiment of the invention.

Referring to FIG. 1 and FIG. 2, FIG. 1 is a schematic diagram of a head-mounted display according to an embodiment of the invention, and FIG. 2 is a schematic diagram of an image generator and a projection lens of the head-mounted display in FIG. 1. A head-mounted display 1000 includes an image generator 10, a projection lens 100, and a waveguide 200.

The image generator 10 is configured to provide an image beam IL. The projection lens 100 is disposed on a path of the image beam IL, and the projection lens 100 has an image side A1 and an object side A2. The image generator 10 is configured at the image side A1 of the projection lens 100. The waveguide 200 is disposed at the object side A2 of the projection lens 100. The projection lens 100 includes a first lens element 1 and a lens element group 100L. The first lens element 1 has a first central axis I1. The first central axis I1 is defined as an imaginary line passing a geometric center position of the first lens element 1. The lens element group 100L is disposed between the image generator 10 and the first lens element 1. The lens element group 100L has a second central axis I2. The second central axis I2 is defined as an imaginary line passing a geometric center position of the lens element group 100L. The lens element group 100L includes a second lens element 2, a third lens element 3, a fourth lens element 4, a fifth lens element 5 arranged sequentially from the object side A2 to the image side A1. As shown as FIG. 2, the second central axis I2 passes through center position of each lens element (second lens element 2, third lens element 3, fourth lens element 4 and fifth lens element 5) of the lens element group 100L, in the other words, each lens element of the lens element group 100L has the same central axis 12. The first central axis I1 of the first lens element 1 and the second central axis I2 of the lens element group 100L are not overlapped. According to an embodiment of the invention, a distance is present between the first central axis I1 and the second central axis I2. The distance may be in a range of 1.5 mm to 2.5 mm, and may further be in a range of 2.1 mm to 2.3 mm.

The waveguide 200 is disposed on the path of the image beam IL and is located at the object side A2 of the projection lens 100. The waveguide 200 includes optical surfaces 61 to 67 (referred to as surfaces 61 to 67 below). After passing through the optical surface 61, the image beam IL enters the waveguide 200. Then, after passing through the optical surface 67, the image beam IL exits the waveguide 200. A pupil IP is located at a position of the pupils of a user who wears the head-mounted display 1000. The user views an image (a virtual image) formed by the image beam IL through the image beam IL that is incident to the pupils of the eyes.

The image generator 10 is a planar light-emitting image generator including an image source and a protection cover. The protection cover has an image-side surface 105 and an object-side surface 106, as shown in FIG. 2. The image source is, for example, a reflective spatial light modulator or a transmissive spatial light modulator, such as a reflective liquid crystal on silicon (LCOS), a digital micro-mirror device (DMD), or a transparent liquid crystal panel.

The image source has a light-emitting surface LS. An included angle between a normal line 13 of the light-emitting surface LS of the image source and the second central axis 12 of the lens element group 100L is not equal to 0 degree. According to an embodiment of the invention, the included angle is in a range of 13 degrees to 15 degrees. Specifically, the normal line 13 of the light-emitting surface LS of the image source and an extending line of the second central axis 12 of the lens element group 100L intersect at a point on the light-emitting surface LS of the image source, and the included angle is formed. The light-emitting surface LS of the image source is disposed to be inclined relative to the projection lens 100. The normal line 13 of the light-emitting surface LS is not parallel to the second central axis 12.

In the embodiment, the first lens element 1, the second lens element 2, the third lens element 3, the fourth lens element 4, and the fifth lens element 5 of the projection lens 100 are all axisymmetric lenses and respectively have image-side surfaces 15, 25, 46, 45, and 55 facing the image side A1 and allowing the image beam IL to pass through and object-side surfaces 16, 26, 36, 46, and 56 facing the object side A2 and allowing the image beam IL to pass through. Since the third lens element 3 and the fourth lens element 4 are cemented into a cemented lens, in FIG. 2, the object-side surface of the fourth lens element 4 and the image-side surface of the third lens element 3 that are cemented to each other are denoted by the same reference numeral 46.

The detailed optical data of the embodiment is shown as Table 1 below. A radius of curvature of the image-side surface 15 shown in Table 1 refers to a radius of curvature of the image-side surface 15 of the first lens element 1 in an optical axis region, and a radius of curvature of the object-side surface 16 refers to a radius of curvature of the object-side surface 16 of the first lens element 1 in an optical axis region. The others are derived based on the same principle. An interval shown in Table 1 refers to a distance between a surface and its next surface. For example, an interval of the surface 67 (4.60821 mm as shown in Table 1) refers to a distance between the surface 67 and the surface 66. An interval of the object-side surface 16 (−6.90145 mm as shown in Table 1) refers to an interval between the object-side surface 16 and the next surface (for example, the image-side surface 15) on the first central axis I1. That is, a thickness of the first lens element 1 on the first central axis I1 is 6.90145 mm. The others are derived based on the same principle.

TABLE 1

| Element | Surface | Radius of curvature (mm) | Interval (mm) | Refractive index | Abbe number |
| --- | --- | --- | --- | --- | --- |
| Pupil IP | IP | Infinity | 18 | | |
| Waveguide 200 | 67 | −100.000 | 4.60821 | 1.53113 | 55.753 |
| Waveguide 200 | 66 | −33.388 | −4.60821 | 1.53113 | 55.753 |

TABLE 1-continued

| Element | Surface | Radius of curvature (mm) | Interval (mm) | Refractive index | Abbe number |
|---|---|---|---|---|---|
| Waveguide 200 | 65 | −100.000 | 7.5 | 1.53113 | 55.753 |
| Waveguide 200 | 64 | −100.000 | −7.5 | 1.53113 | 55.753 |
| Waveguide 200 | 63 | −100.000 | 2.8818 | 1.53113 | 55.753 |
| Waveguide 200 | 62 | Infinity | −3.76419 | 1.53113 | 55.753 |
| Waveguide 200 | 61 | 10.687 | −2.04036 | | |
| First lens element 1 | Object-side surface 16 | −12.202 | −6.90145 | 1.6422 | 22.4084 |
| | Image-side surface 15 | −12.961 | −1.57224 | | |
| Second lens element 2 | Object-side surface 26 | −7.153 | −4 | 1.6422 | 22.4084 |
| | Image-side surface 25 | −4.754 | −2.41857 | | |
| Third lens element 3 | Object-side surface 36 | 8.158 | −2 | 1.84666 | 23.7775 |
| Fourth lens element 4 | Object-side surface 46 | −9.391 | −6.17428 | 1.72409 | 52.065 |
| | Image-side surface 45 | 9.984 | −0.1 | | |
| Fifth lens element 5 | Object-side surface 56 | −22.128 | −10.4554 | 1.53113 | 55.753 |
| | Image-side surface 55 | 10.061 | −18.0517 | | |
| Protection cover | Object-side surface 106 | Infinity | −1 | | |
| Protection cover | Image-side surface 105 | Infinity | −0.55 | 1.51 | 62.999 |
| Image source | Light-emitting surface LS | Infinity | −0.303 | | |

According to Table 1, the first lens element 1 is a positive meniscus lens element. The second lens element 2 is a negative meniscus lens element. The third lens element 3 is a biconcave lens element. Both of the fourth lens element 4 and the fifth lens element 5 are biconvex lens elements. Referring to FIG. 1 again, it is shown that the light-emitting surface LS of the image source emits the image beam IL, and the image beam IL sequentially passes through the fifth lens element 5, the fourth lens element 4, the third lens element 3, the second lens element 2, and the first lens element 1. Then, the image beam IL passes through the surface 61 of the waveguide 200 to be incident to the waveguide 200 and be sequentially reflected by the surfaces 62, 63, 64, 65, and 66 in the waveguide 200. Lastly, the image beam IL passes through the surface 67 to exit the waveguide 200 and reach the pupil IP. In the embodiment, the image beam IL has total internal reflection on the surfaces 63, 64, and 65, and the surfaces 62 and 66 are coated with a reflection film. A refractive index of the waveguide 200 is in a range of 1.45 to 1.65.

In an embodiment, the surfaces 61, 62, and 66 of the waveguide 200 are, for example, freeform surfaces. The image-side surface 25 of the second lens element 2, the object-side surface 36 of the third lens element 3, and the image-side surface 45 and the object-side surface 46 of the fourth lens element 4 are all spherical surfaces. The image-side surface 15 and the object-side surface 16 of the first lens element 1, the object-side surface 26 of the second lens element 2, and the image-side surface 55 and the object-side surface 56 of the fifth lens element 5, the five surfaces in total, are all aspherical surfaces. The aspherical surfaces are defined according to the following equation (1):

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

Y: a distance between a point on the aspherical curve and the central axis of the lens element;

Z: a depth of the aspherical surface, which is a vertical distance between a point on the aspherical surface in a distance of Y from the optical axis and a tangent plane tangent to a vertex of the aspherical surface on the optical axis;

R: a radius of curvature of the surface of the lens;

K: a conic constant;

$a_{2i}$: the $2i^{th}$ aspherical coefficient.

All the aspherical coefficients of the aspherical surfaces in equation (1) are shown in Table 2 below. The field 16 in Table 2 represents the aspherical coefficient of the object-side surface 16 of the first lens element 1. The other fields are arranged based on the same principle.

TABLE 2

| Surface | 16 | 15 | 26 | 56 | 55 |
|---|---|---|---|---|---|
| R | −12.202 | −12.961 | −7.153 | −22.128 | 10.061 |
| K | −12.202 | −12.9612 | −7.15306 | −22.1282 | 10.06122 |
| $a_4$ | −0.6898 | 0.380302 | −0.9977 | 3.167479 | −0.41374 |
| $a_6$ | −1.47E−05 | 1.24E−05 | −9.20E−05 | 0.000172 | −2.00E−05 |
| $a_8$ | −3.72E−07 | −1.36E−06 | 0 | 3.52E−07 | 8.07E−08 |
| $a_{10}$ | 1.35E−10 | 4.94E−09 | 0 | 0 | 0 |

The surfaces 63, 64, 65, and 67 of the waveguide 200 are all spherical surfaces so that the waveguide 200 may be fittable to a facial outline of the user. Furthermore, the radiuses of curvature of the surfaces 63, 64, 65, and 67 are all the same. In other words, an ambient light beam may transmit through the waveguide 200. When the user views a real object out of the waveguide 200, the diopter of the waveguide 200 is 0, which means that the real object viewed by the user does not become larger or smaller due to the waveguide 200. The surface 66 of the waveguide 200 may be a coating or an element that allows the ambient light beam to pass through. The three surfaces 61, 62, and 63 of the waveguide 200 are non-axisymmetric optical surfaces, and they may be freeform surfaces, aspherical surfaces, and the like. The non-axisymmetric optical surfaces are defined according to equation (2) below:

$$z = \frac{1/r \times \phi^2}{1 + \sqrt{1-(1+k)\times\left(\frac{\phi}{r}\right)^2}} + \sum c_{m,n} x^m y^n$$

r: a radius of curvature;

φ: a diameter of the lens element k: a conic constant;

$c_{m,n}$: XY polynomial coefficient.

The radius of curvature r, each constant k, and $c_{m,n}$ of the non-axisymmetric optical surface equation (2) are shown as Table 3 below. The field 61 in Table 3 represents the surface 61. The other fields are arranged based on the same principle. In Table 3, the value corresponding to the field y represents a polygonal coefficient $c_{0,1}$, the value corresponding to the field $x^2$ represents a polygonal coefficient $c_{2,0}$, the value corresponding to the field $y^2$ represents a polygonal coefficient $c_{0,2}$, the value corresponding to the field $x^2y$ represents a polygonal coefficient $c_{2,1}$, and other fields are arranged based on the same principle.

TABLE 3

|  | 61 | 62 | 66 |
|---|---|---|---|
| r | 10.687 | Infinity | −33.388 |
| k | −1 | −1 | −1 |
| Y | 4.22E−01 | 7.23E−02 | 4.68E−01 |
| $X^2$ | −1.45E−02 | 7.80E−05 | 3.22E−03 |
| $Y^2$ | −1.92E−02 | −1.79E−03 | 4.52E−04 |
| $X^2Y$ | 2.10E−04 | −8.57E−05 | 1.38E−04 |
| $Y^3$ | 6.20E−04 | −2.72E−05 | 2.02E−04 |
| $X^4$ | 5.04E−05 | −7.71E−06 | −1.88E−06 |
| $X^2Y^2$ | −1.02E−04 | −1.07E−05 | −6.99E−06 |
| $Y^4$ | 5.64E−05 | 2.15E−06 | −8.31E−06 |
| $X^4Y$ | −8.76E−06 | 0 | 2.82E−09 |
| $X^2Y^3$ | −1.86E−05 | 0 | 2.75E−07 |
| $Y^5$ | 8.80E−06 | 0 | 3.21E−07 |
| $X^6$ | −1.51E−07 | 0 | 4.70E−10 |
| $X^4Y^2$ | −2.64E−07 | 0 | −2.89E−08 |
| $X^2Y^4$ | −9.73E−07 | 0 | −4.36E−08 |
| $Y^6$ | 1.23E−06 | 0 | −2.18E−08 |
| $X^6Y$ | −1.02E−09 | 0 | 5.91E−10 |
| $X^4Y^3$ | −6.07E−08 | 0 | 1.98E−09 |
| $X^2Y^5$ | −9.56E−08 | 0 | −2.34E−09 |
| $Y^7$ | 7.04E−08 | 0 | −4.92E−10 |
| $X^8$ | 8.17E−10 | 0 | 1.08E−10 |
| $X^6Y^2$ | −1.85E−09 | 0 | 7.70E−10 |
| $X^4Y^4$ | −4.42E−09 | 0 | 8.09E−10 |
| $X^2Y^6$ | −3.32E−09 | 0 | 8.87E−10 |
| $Y^8$ | 1.76E−09 | 0 | 1.74E−10 |
| $X^8Y$ | 0 | 0 | −1.94E−12 |
| $X^6Y^3$ | 0 | 0 | −2.88E−11 |
| $X^4Y^5$ | 0 | 0 | −4.35E−12 |
| $X^2Y^7$ | 0 | 0 | 5.55E−11 |
| $Y^9$ | 0 | 0 | 2.39E−11 |
| $X^{10}$ | 0 | 0 | −7.50E−13 |
| $X^8Y^2$ | 0 | 0 | −5.16E−12 |
| $X^6Y^4$ | 0 | 0 | −6.83E−12 |
| $X^4Y^6$ | 0 | 0 | −6.40E−12 |
| $X^2Y^8$ | 0 | 0 | −8.97E−12 |
| $Y^{10}$ | 0 | 0 | −2.29E−12 |

Referring to Table 4 below, the decenter value (deviation distance) (mm) and the tilt angle (degree) of the optical surfaces in Table 1 are described. The field 66 in Table 4 represents the surface 66, and the field 16 represents the object-side surface 16 of the first lens element 1. The other fields are arranged based on the same principle.

TABLE 4

|  | Decenter value (mm) | Tilt angle (degree) |
|---|---|---|
| 66 | 0 | 0.0747014 |
| 62 | 35.0884 | 25.5492 |
| 61 | 42.5719 | −29.5515 |
| 16 | −2.21214 | 13.5515 |
| 26 | −3.2 | 0 |
| 105 | 0 | −14.294 |

Figure 3:
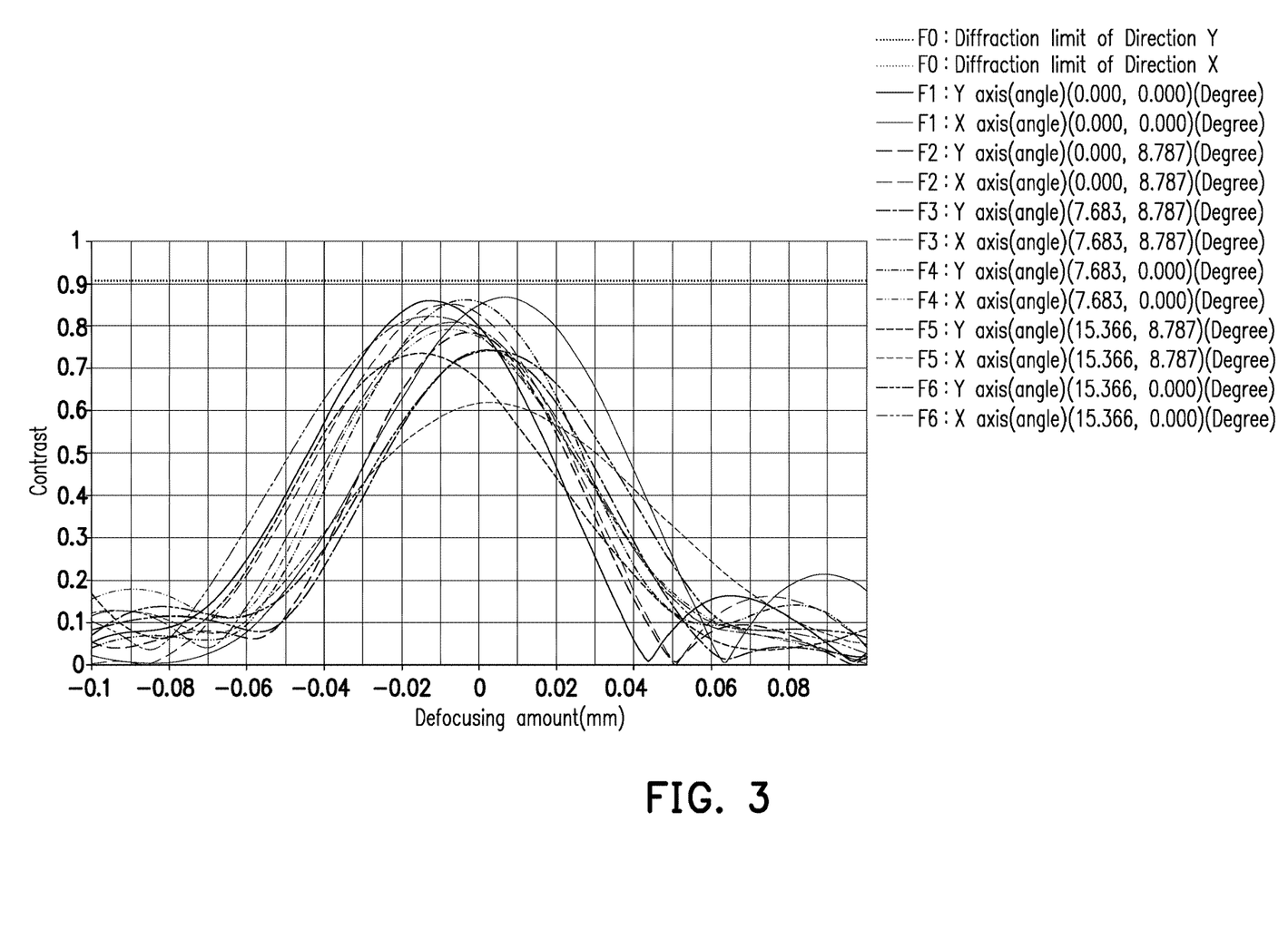
FIG. 3 is a curve chart of a modulation transfer function of a head-mounted display according to an embodiment of the invention.

Referring to FIG. 3, FIG. 3 is a curve chart of a modulation transfer function of a head-mounted display according to an embodiment of the invention. In the curve chart known by practitioners skilled in this art, each curve represents the degree of an X-axis included angle and the degree of a Y-axis included angle. The vertical axis represents the contrast ratio of the head-mounted display, and the horizontal axis represents the defocusing amount of the head-mounted display. With regard to a resolution of 50 lp/mm (line pair/millimeter), a modulation transfer function (MTF) of the image beam with a wavelength in a range of 450 nm to 650 nm generated by the head-mounted display 1000 is greater than 0.5 so that a demand of high resolution is satisfied. The modulation transfer function includes the influences on the image quality caused by optical aberrations.

Figure 4:
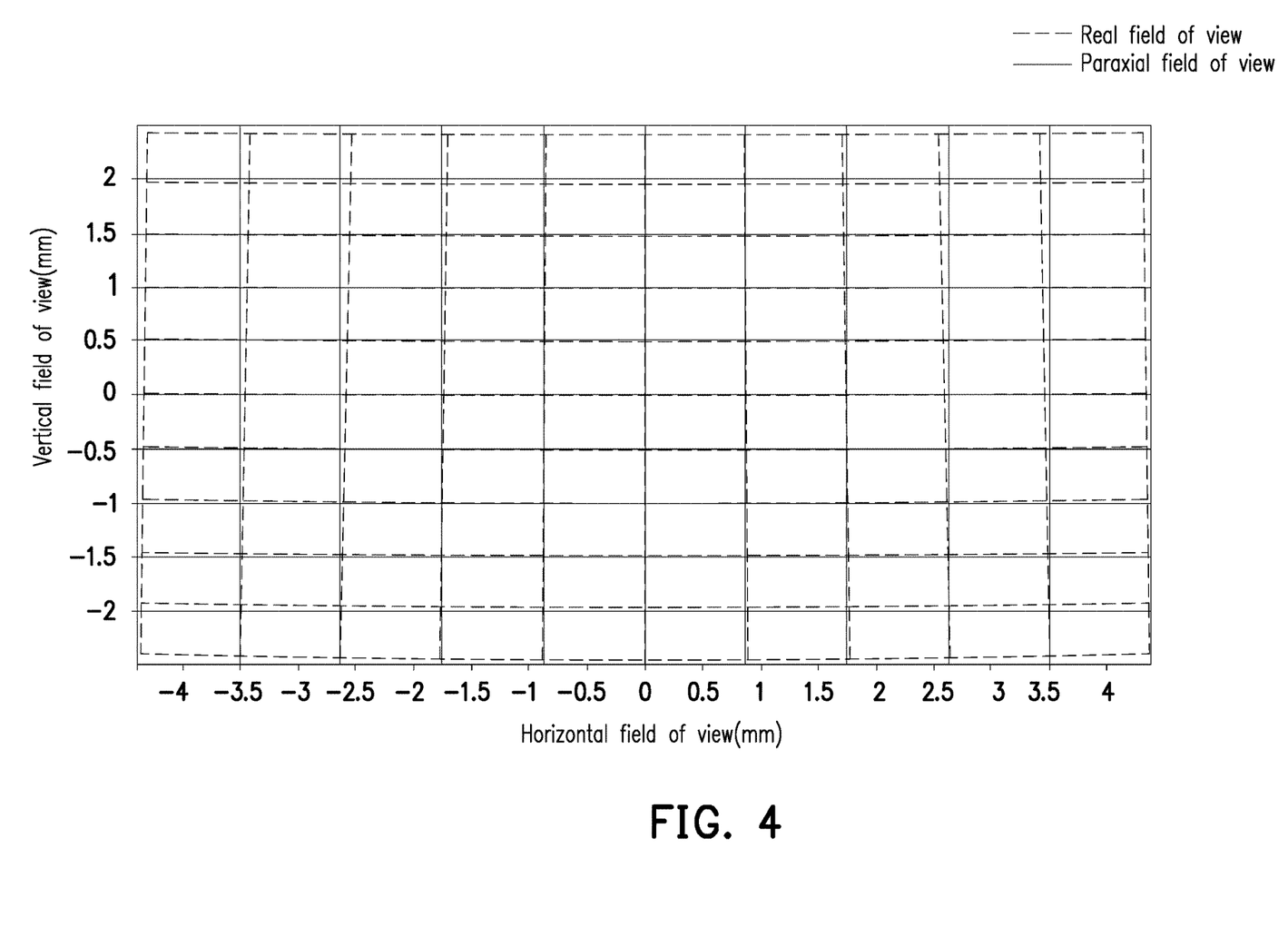
FIG. 4 is a schematic diagram of distortion of a head-mounted display according to an embodiment of the invention.

Referring to FIG. 4, FIG. 4 is a schematic diagram of distortion of a head-mounted display according to an embodiment of the invention. In a field of view (FOV) of 30.73×17.57×35° in which the field of view of the horizontal direction (X direction) is 30.73°, the field of view of the vertical direction (Y direction) is 17.57°, and the field of view of the diagonal direction is 35°, the distortions at the top and bottom of the image of the head-mounted display 1000 are respectively only 0.461% and −1.837%.

In summary of the above, in the head-mounted display provided in the embodiments of the invention, the first central axis of the first lens element and the second central axis of the lens element group are not overlapped, and the included angle that is not equal to 0 degree is present between the normal line of the light-emitting surface of the image source and the second central axis. Therefore, the asymmetric optical aberration caused by the waveguide is eliminated. As a result, instead of adopting multiple non-axisymmetric lens elements, the multiple axisymmetric lens elements are adopted, and the manufacturing cost is greatly reduced. Moreover, the head-mounted display provided in the embodiments of the invention is light and slim, and exhibits low distortion and high image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display, comprising an image generator, a projection lens, and a waveguide, wherein:
   the image generator is configured to provide an image beam;
   the projection lens is disposed on a path of the image beam and has an image side and an object side, the image generator is configured at the image side, and the projection lens comprises a first lens element and a lens element group, wherein:
   the first lens element has a first central axis,
   the lens element group is disposed between the image generator and the first lens element, the lens element group has a second central axis,
   wherein the first central axis of the first lens element and the second central axis of the lens element group are not overlapped, and
   the waveguide is disposed on the path of the image beam and is located at the object side of the projection lens, the waveguide has two spherical surfaces facing each other, the two spherical surfaces have a same radius of curvature, and the image beam is reflected by the two spherical surfaces.

2. The head-mounted display according to claim 1, wherein the image generator has an image source, and an included angle between a normal line of a light-emitting surface of the image source and the second central axis is not equal to 0 degree.

3. The head-mounted display according to claim 2, wherein the included angle is in a range of 13 degrees to 15 degrees.

4. The head-mounted display according to claim 1, wherein the projection lens comprises one to three aspherical lens elements.

5. The head-mounted display according to claim 1, wherein a distance between the first central axis and the second central axis is in a range of 1.5 mm to 2.5 mm.

6. The head-mounted display according to claim 1, wherein each lens element comprised in the projection lens is an axisymmetric lens element.

7. The head-mounted display according to claim 1, wherein the waveguide has a first non-axisymmetric optical surface, and after transmitting through the projection lens, the image beam is incident to the waveguide from the first non-axisymmetric optical surface.

8. The head-mounted display according to claim 7, wherein the first lens element and the first non-axisymmetric optical surface are disposed adjacently.

9. The head-mounted display according to claim 7, wherein the waveguide further comprises a second non-axisymmetric optical surface and a third non-axisymmetric optical surface, and the image beam is reflected by the second non-axisymmetric optical surface and the third non-axisymmetric optical surface.

10. The head-mounted display according to claim 1, wherein the image beam further enters an eye of a user after transmitting through one of the two spherical surfaces.

11. The head-mounted display according to claim 1, wherein a refractive index of the waveguide is in a range of 1.45 to 1.65.

12. The head-mounted display according to claim 1, wherein a modulation transfer function of the image beam with a wavelength in a range of 450 nm to 650 nm is greater than 0.5.

* * * * *